United States Patent [19]

Yonemitsu et al.

[11] 3,896,185

[45] July 22, 1975

[54] FLAME RESISTANT MOLDING RESIN COMPOSITION

[75] Inventors: Eiichi Yonemitsu, Chiba; Seiichi Kamiyama; Toshiaki Kanada; Norio Nagai, all of Tokyo, all of Japan

[73] Assignee: Mitsubishi Gas Chemical Company, Inc., Tokyo, Japan

[22] Filed: Feb. 19, 1974

[21] Appl. No.: 443,244

Related U.S. Application Data

[63] Continuation-in-part of Ser. No. 382,122, July 24, 1973, abandoned.

[30] Foreign Application Priority Data

July 29, 1972 Japan.......................... 47-75536

[52] U.S. Cl........................... 260/873; 260/DIG. 24
[51] Int. Cl................................................ C08g 39/10
[58] Field of Search.... 260/860, 75 R, 873, DIG. 24

[56] References Cited
UNITED STATES PATENTS

| | | | |
|---|---|---|---|
| 3,207,777 | 9/1965 | Szobel et al. | 260/463 |
| 3,239,582 | 3/1966 | Keskkula et al. | 260/873 |
| 3,644,574 | 2/1972 | Jackson et al. | 260/873 |

*Primary Examiner*—Morris Liebman
*Assistant Examiner*—T. Pertilla
*Attorney, Agent, or Firm*—Stewart and Kolasch, Ltd.

[57] ABSTRACT

A molding resin composition high in flame resistance and excellent in mechanical properties and moldability which contains a nucleus-halogenated aromatic polycarbonate and a rubber-modified nucleus-chlorinated styrene resin.

6 Claims, No Drawings

FLAME RESISTANT MOLDING RESIN COMPOSITION

This application is a continuation-in-part of our co-pending application, Ser. No. 382,122, filed July 24, 1973, now abandoned.

FIELD OF THE INVENTION

This invention relates to a novel polycarbonate resin composition high in flame resistance and excellent in mechanical property, thermal property, moldability and the like physical properties.

BACKGROUND OF THE INVENTION

An aromatic polycarbonate shows a self-extinguishing property by itself, but has such drawback that flames are dropped down during its combustion. Moreover, the level of flame resistance required for engineering plastics at present is high. Accordingly, there are such proposals that (i) a halogenated-carbonate polymer is prepared from 2,2-bis(3,5-dihalogeno-4-hydroxyphenyl) propane in which the "halogeno" group is chlorine or bromine (hereinafter referred to as "tetrahalogenobisphenol A"), (ii) a halogenated-carbonate copolymer is prepared from said tetrahalogenobisphenol A and 2,2-bis(4-hydroxyphenyl) propane, or (iii) a blended polycarbonate is prepared by incorporating the aromatic polycarbonate with the halogenated-carbonate polymer or the halogenated-carbonate copolymer as mentioned above, thereby intending to enhance the aromatic polycarbonate in flame resistance (refer to, for example, Japanese Patent Publication No. 24,660/72). However, an aromatic polycarbonate itself is not excellent in melt-moldability. Accordingly, if the aromatic polycarbonate is incorporated with the above-mentioned carbonate polymer or copolymer having halogen groups introduced into the nucleus thereof, the aromatic polycarbonate is further degraded in moldability, and a high molding temperature is required for the molding thereof. Consequently, not only the product is greatly deteriorated in appearance, but also the halogen groups are released during the molding to cause the problem of corrosion of the metal material constituting the molding machine. Thus, the aromatic polycarbonate is required to be improved in flame resistance, and the aromatic polycarbonate or the nucleus-halogenated aromatic polycarbonate is required to be improved in moldability.

As measures for improving aromatic polycarbonates in moldability by varying the flow characteristics thereof, there have been proposed many processes in which the polycarbonates are incorporated with a styrene type resin and/or an acrylic type resin which are superior in moldability to the polycarbonates (refer to, for example, U.S. Pat. No. 3,239,582). The styrene or acrylic type resins are, for example, a graft copolymer of a polybutadiene and a mixture of a vinyl cyanide compound and a vinyl aromatic hydrocarbon; a copolymer of a butadiene-vinyl aromatic hydrocarbon copolymer as a backbone polymer and, grafted on said backbone polymer, an alkyl acrylate and an vinyl aromatic hydrocarbon; or a quaternary graft copolymer obtained by polymerizing a mixture of styrene, methyl methacrylate and acrylonitrile monomers in a butadiene-styrene copolymer latex (refer to for example, Japanese Patent Publication Nos. 15,255/63, 71/64 and 11,496/67). However, no consideration as to flame resistance has been made at all in the resin compositions according to the above-mentioned processes. Thus, the said resin compositions are inferior in flame resistance, which is one of the important characteristics required for engineering plastics, and hence are necessarily restricted in uses.

Generally, a resin composition is made flame-resistant by adding a so-called flame retardant to the resin composition. In order to attain an excellent flame resistance, however, the flame retardant is required to be added in a large amount. Moreover, the said additive ordinarily has a detrimental effect on the mechanical and thermal properties of the product resin composition. Further, even if the additive is added to a resin composition, it tends to escape or dissipate out of the resin composition or tends to be deteriorated in efficiency during molding of the composition or during use of the product. As the result, the product is decreased in flame resistance or, in some cases, shows no flame resistance at all.

SUMMARY OF THE INVENTION

The present inventors repeated extensive studies with an aim to obtain a molding resin composition which is excellent in self-extinguishing property and well balanced in mechanical property, thermal property, moldability and the like physical properties. As the result, the inventors have found that a resin composition containing a nucleus-halogenated aromatic polycarbonate and a rubber-modified nucleus-chlorinated styrene resin can sufficiently satisfy the above-mentioned requirements.

The nucleus-halogenated aromatic polycarbonate contained in the resin composition of the present invention is a polymer or copolymer having an intrinsic viscosity in the range from 0.4 to 1.0, preferably from 0.5 to 0.7 (in methylene chloride; at 20°C) and having, as repeated units, groups of the formula,

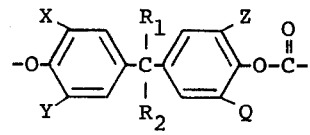

wherein X, Y, Z and Q are individually one member selected from hydrogen, chlorine and bromine atoms, provided that not all of them are hydrogen atoms at the same time, and that in case one of the substituents X to Q is a chlorine or bromine atom, the other 3 substituents are not bromine or chlorine atoms; and $R_1$ and $R_2$, which may be the same or different, are individually a hydrogen atom or an alkyl group having 5 or less carbon atoms.

The nucleus-halogenated aromatic polycarbonate is typically obtained by substituting a part or all of a bis-(hydroxyaryl) alkane, e.g. 2,2-bis(4-hydroxyphenyl)-propane, by a nucleus-halogenated bis(hydroxyaryl)alkane, e.g. 2,2-bis(4-hydroxy-3,5-dibromophenyl)propane or 2,2-bis(4-hydroxy-3,5-dichlorophenyl)propane, and then reacting the thus substituted alkane with a polycarbonate precursor such as phosgene or diaryl carbonate, for example diphenyl carbonate. Further, the nucleus-halogenated aromatic polycarbonate includes a polycarbonate prepared by using, as a molecular weight regulator, such halogenated phenol as pentachlorophenol, pentabromophenol, tetrachlorophenol or tetrabromophenol. In the composition of the present invention, there is preferably used a polymer derived from a starting composition, in which at least 1.0% by weight of the total bis-(hydroxyaryl)alkane has been halogenated at the nucleus. The nucleus-halogenated aromatic polycarbonate may be used in admixture with an aromatic polycarbonate which has not been halogenated at the nucleus.

The rubber-modified nucleus-chlorinated styrene resin is a copolymer resin or resin composition containing polymer units derived from a conjugated diene monomer such as butadiene or isoprene, polymer units derived from a nucleus-chlorinated styrene

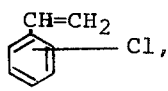

and polymer units derived from a vinyl cyanide or an alkyl methacrylate. The rubber-modified nucleus-chlorinated styrene resin to be used in the present invention has a flow characteristic such that the amount of melt flow through a standard nozzle of 1 mm in diameter and 2 mm in length measured at 260°C, under loading of 30 kg is from 1 to 500 ($\times 10^{-3}$ cc/sec), preferably from 2 to 200 ($\times 10^{-3}$ cc/sec). The vinyl cyanide signifies acrylonitrile or methacrylonitrile, and the alkyl methacrylate signifies a methacrylic acid ester of an alkyl alcohol having at most 12 carbon atoms. If desired, a part of the vinyl cyanide or alkyl methacrylate may be substituted by another monomer copolymerizable therwith, e.g. a styrene or a derivative thereof such as styrene, vinyltoluene or $\alpha$-methylstyrene, or an alkyl acrylate such as methyl acrylate.

In the rubber-modified nucleus-chlorinated styrene resin used in the present invention, the polymer units derived from the conjugated diene monomer should be 3 to 30 percent by weight, preferably 10 to 20 percent by weight, the polymer units derived from the nucleus-chlorinated styrene should be 50 to 87 percent by weight, preferably 60 to 80 percent by weight and the polymer units derived from a vinyl cyanide or an alkyl methacrylate should be 10 to 30 percent by weight, preferably 10 to 20 percent by weight based on the weight of the resin.

The above-mentioned rubber-modified nucleus-chlorinated styrene resin is preferably a resin whose rubber modification has been accomplished by graft polymerization, because the miscibility of the said styrene resin with the polycarbonate affects the properties, particularly impact resistance, of the product resin composition. The rubber modified resin may be prepared according to any of polymer blend process, graft-copolymerization process and graft-blend graft copolymerization-polymer blend-combined process which are ordinarily practiced on a commercial scale. The most typical process for preparation of the rubber-modified nucleus-chlorinated styrene resin is a heterogeneous graft polymerization process in which a monomer composed mainly of a nucleus-chlorinated styrene is graft-polymerized according to emulsion polymerization on a rubbery polymer derived from a conjugated diene monomer in a latex, or a homogeneous graft polymerization process in which a solution of said rubbery polymer in a monomer composed mainly of a nucleus-chlorinated styrene is pre-polymerized with stirring to bring about phase inversion, thereby forming particles of the rubber material, and the thus formed rubber particles are dispersed in water and then subjected to suspension polymerization to complete the graft polymerization. Alternatively, there may be adopted a copolymerization-polymer blend process in which the aforesaid graft copolymer and nucleus-chlorinated styrene copolymer are mixed with each other to form a composition. In the case of this invention a mixture of the aforesaid vinyl cyanide and/or alkyl methacrylate and the nucleus-chlorinated styrene is used as the copolymerization monomer, the resulting resin being advantageously increased in miscibility with the polycarbonate.

The resin composition of the present invention is prepared by mixing the nucleus-halogenated aromatic polycarbonate with the rubber-modified nucleus-chlorinated styrene resin. For the mixing, there is adopted a procedure which is ordinarily employed for the blending of resins. That is, the polycarbonate and the styrene resin are intimately mixed with each other by use of, for example, an extruder, a Banbury mixer or a kneading roll. The mixing proportions of the two are not critical, so far as the resulting resin composition contains 90 to 20 percent by weight of the nucleus-halogenated aromatic polycarbonate and 10 to 80 percent by weight of the rubber-modified nucleus-chlorinated styrene resin. Further, it is desirable that in the composition of the present invention, the polymer units derived from the conjugated diene monomer are contained in a proportion corresponding to 1 to 20 percent by weight, the polymer units derived from the nucleus-chlorinated styrene in a proportion corresponding to 10 to 70 percent by weight, and the polymer units derived from vinyl cyanide or alkyl methacrylate in a proportion corresponding to 1 to 20 percent by weight, based on the weight of the composition.

The resin composition of the present invention overcomes both the drawbacks of the nucleus-halogenated aromatic polycarbonate which are seen in moldability, Izod impact strength and modulus of elasticity, and the drawbacks of the rubber-modified nucleus-chlorinated styrene resin which are seen in flame resistance, thermal property such as heat resistance and impact strength. In the case of a composition containing the nucleus-halogenated aromatic polycarbonate in a larger proportion, such physical properties as moldability and impact strength are improved, while in the case of a composition containing the rubber-modified nucleus-chlorinated styrene resin in a larger proportion, such physical properties as flame resistance and thermal property such as heat resistance are improved. In the case of a composition containing substantially equal amounts of the two resin components, the balance between such physical properties as moldability, thermal property, flame resistance, mechanical property, etc., is maintained quite harmonically to make it possible to provide a novel resin composition having preferable properties that have not been seen hitherto.

The excellent flame resistance displayed by the resin composition of the present invention is considered ascribable to the facts that there is not substantial difference in flame resistance between the nucleus-halogenated aromatic polycarbonate and the rubber-modified nucleus-chlorinated styrene resin, and that the halogen groups, which contribute to the flame resistance, have been dispersed in the two resins. In the composition of the present invention, there is seen no such phenomenon as non-uniformity in flame resistance due to insufficient dispersion of flame retardant which is seen in a composition incorporated with a flame retardant, nor such phenomenon as volatilization or dissipation of flame retardant component. Moreover, the flame resistance is not decreased during molding of the composition or during use of the product, and there is no such fear as environmental contamination due to the flame retardant component.

If necessary, the composition of the present invention may be incorporated with an ordinary polycarbonate, or a high impact styrene resin, an ABS resin or the like resin. When an inorganic flame retardant adjutant such as antimony oxide is used therewith, the composition is more enhanced in flame resistance. In addition, the composition may be incorporated, if necessary, with any of antioxidants, lubricants, fillers and pigments which are ordinarily used as additives for synthetic resins.

Characteristics of the resin compositions of the present invention are illustrated below with reference to the examples, in which all parts and percentages are by weight unless otherwise specified.

EXAMPLE 1

A bifunctional phenol mixture comprising 85 parts of 2,2-bis(4-hydroxyphenyl)propane and 15 parts of 2,2-bis-(4-hydroxy-3,5-dibromophenyl)propane was treated according to the phosgene method to prepare a nucleus-brominated aromatic carbonate copolymer. The copolymer had an intrinsic viscosity of 0.58 in methylene chloride solution at 20°C.

On the other hand, a mixture comprising 100 parts of a polybutadiene latex (polybutadiene solid content 60 percent; Gel content 85 percent; average diameter of polymer particles 0.3 $\mu$), 6 parts of acrylonitrile and 34 parts of a nucleus-chlorinated styrene (consisting of 65 percent of ortho isomer and 35 percent para isomer) was subjected to ordinary emulsion graft polymerization to obtain an emulsion of a graft copolymer. This emulsion, in an amount to contain resin solids corresponding to 16.6 parts of the graft copolymer, was latex-blended with an emulsion containing 83.4 parts of an acrylonitrile-nucleus-chlorinated styrene copolymer which had separately been obtained according to emulsion copolymerization (the monomer feed ratio of acrylonitrile/nucleus-chlorimated styrene was 15:85 by weight, and the nucleus-chlorinated styrene had the same isomer ratio as mentioned previously). The thus blended latex was coagulated and separated to obtain a rubber-modified acrylonitrile-nucleus-chlorinated styrene resin composition.

Thereafter, a powder of the aforesaid nucleus-brominated aromatic carbonate copolymer (component A) and a powder of the rubber-modified acrylonitrile-nucleus-chlorinated styrene resin composition (component B) were mixed with each other in a weight ratio of 1:1. The resulting mixture was melted and kneaded by means of an extruder at a cylinder temperature of 250°C., and then pelletized to obtain a resin composition. The thus obtained resin composition was subjected to injection molding at a cylinder temperature of 250°C., which was about 40°C. lower than the cylinder temperature for injection molding of the brominated carbonate copolymer alone, to prepare a test piece. Physical properties of the test piece and of the components A and B were as set forth in the following table:

|  | Flow characteristic 260°C Load 30 kg. ($\times 10^{-3}$ cc/sec) | Izod impact value, notched ¼" bar (kg.cm/cm) | Tensile strength (kg/cm$^2$) | Flexural modulus (kg/cm$^2$) | Heat distortion temperature, 18.5 kg/cm$^2$, not annealed (°C) |
|---|---|---|---|---|---|
| Composition of Example 1 | 58 | 20 | 600 | 30,000 | 114 |
| Component A | 12 | 5 | 690 | 25,000 | 141 |
| Component B | 85 | 4 | 485 | 31,000 | 92 |

As seen in the above table, the resin composition of the present invention is far higher in impact strength than the components A and B, which are constituents of the composition. This substantiates the fact that the composition is excellent in compatibility. Further, it is clear that the composition of the present invention has well-balanced physical properties.

The test piece was examined in combustibility according to Underwriter's Laboratory's subject 94 Test. As the result, the combustion time of the test piece, which had a thickness of 1.6 mm, was within 5 seconds after each of the first and second ignition after the first combustion had ceased.

EXAMPLE 2

The same nucleus-brominated aromatic carbonate copolymer and rubber-modified acrylonitrile-nucleus-chlorinated styrene resin composition as in Example 1 were mixed with each other in a ratio of 1:3. The resulting mixture was melted and kneaded by means of an extruder at a cylinder temperature of 250°C, and then pelletized to obtain a resin composition. This resin composition was molded at a cylinder temperature of 230°C, which was 60°C lower than the cylinder temperature for injection molding of the brominated carbonate copolymer alone, to obtain a molded article. Physical properties of the molded article were as follows:

| | |
|---|---|
| Izod impact value (notched ¼" bar) | 10 kg.cm/cm |
| Tensile strength | 550 kg/cm² |
| Heat distortion temperature (18.5 kg/cm², not annealed) | 100°C |

Flammability of the resin composition obtained in this example was tested according to ASTM D635-68. As the result, the test piece of said composition was judged to be "self-extinguishing."

EXAMPLE 3

A test piece was prepared in the same manner as in Example 1, except that one half the amount of the nucleus-brominated aromatic carbonate copolymer was replaced by an ordinary bisphenol A type polycarbonate. Physical properties of the test piece were as follows:

| | |
|---|---|
| Flow characteristic (260°C, Load 30 kg) | 65 × 10⁻³ cc/sec |
| Heat distortion temperature (18.5 kg/cm², not annealed) | 110°C |
| Izod impact value (notched ¼" bar) | 20 kg.cm/cm |

In the flammability test of said composition in the same manner as Example 2, the test piece was judged to be self-extinguishing.

EXAMPLE 4

A bifunctional phenol mixture comprising 99 parts of 2,2-bis(4-hydroxyphenyl)propane and 1 part of 2,2-bis-(4-hydroxy-3,5-dibromophenyl)propane was treated according to the phosgene method to prepare a nucleus-brominated aromatic carbonate copolymer having an intrinsic viscosity of 0.55, measured in methylene chloride at 20°C.

On the other hand, 33.2 parts of the graft copolymer prepared in Example 1 was blended with 66.8 parts of the copolymer prepared in Example 1 in the same latex-blending manner as in Example 1 to obtain a rubber-modified acrylonitrile-nucleus-chlorinated styrene resin composition, which had physical properties of a flow characteristic of 80 × 10⁻³ cc/sec, Izod impact value of 14 kg.cm/cm, tensile strength of 380 kg/cm², flexural modulus of 23,000 kg/cm² and heat distortion temperature of 94°C.

The nucleus-brominated carbonate copolymer and the rubber-modified acrylonitrile-nucleus-chlorinated styrene resin composition were mixed with each other in a weight ratio of 8:2 together with 2 parts of diantimony trioxide. The resulting mixture was melted and kneaded by means of an extruder at a cylinder temperature of 260°C, and then pelletized to obtain a resin composition. This composition was injection moldable at a cylinder temperature 20° to 40°C lower than the cylinder temperature for injection molding of the nucleus-brominated carbonate copolymer alone, and thus had been greatly improved in moldability. The molded article had the following properties:

| | |
|---|---|
| Izod impact value (notched ¼" bar) | 36 kg.cm/cm |
| Tensile strength | 670 kg/cm² |
| Flexural modulus | 26,000 kg/cm² |
| Heat distortion temperature (18.5 kg/cm², not annealed) | 118°C |

According to the same combustibility test as in Example 1, the flames, both after the first and second ignition, extinguished within 15 seconds after removal of the burner, and no ignition of the cotton was observed.

EXAMPLE 5

A bifunctional phenol mixture comprising 90 parts of 2,2-bis(4-hydroxyphenyl)propane and 10 parts of 2,2-bis-(4-hydroxy-3,5-dichlorophenyl)propane was treated according to the phosgene method to prepare a nucleus-chlorinated aromatic carbonate copolymer having an intrinsic viscosity of 0.53 in methylene chloride at 20°C.

On the other hand, a rubber modified acrylonitrile-nucleus-chlorinated styrene resin composition was prepared in entirely the same manner as in Example 1, except that a butadiene-nucleus-chlorinated styrene copolymer rubber (butadiene content 69 percent by weight; Gel content 50percent; average diameter of polymer particles 0.2 μ) was used in place of the polybutadiene. The rubber modified acrylonitrile-nucleus-chlorinated styrene resin composition thus-obtained had physical properties of a flow characteristic of 90 × 10⁻³ cc/sec, Izod impact value of 3 kg.cm/cm, tensile strength of 500 kg/cm² and heat distortion temperature of 97°C.

A powder of the chlorinated carbonate copolymer and a powder of the rubber modified acrylonitrile-nucleus-chlorinated styrene resin composition were mixed with each other in a weight ratio of 1:1. 100 Parts of the resulting powdery mixture was incorporated with 2 parts of diantimony trioxide, kneaded by means of a Banbury mixer at 210°C, and then pelletized by use of an extruder to obtain a resin composition. The thus obtained resin composition was subjected to injection molding at a temperature of 240°C, at which a bisphenol A type polycarbonate was by no means moldable. Physical properties of the molded article were as follows:

| | |
|---|---|
| Izod impact value (notched ¼" bar) | 10 kg.cm/cm |
| Tensile strength | 590 kg/cm² |
| Heat distortion temperature (18.5 kg/cm², not annealed) | 114°C |

According to the same combustibility test as in Example 1, the combustion time of the test piece was within 5 seconds both after the first and second ignition.

EXAMPLE 6

6 parts of polybutadiene (prepared according to solution polymerization; Mooney viscosity ML4 (100°C) 35) was dissolved in a monomer mixture comprising 15 parts of methyl methacrylate and 85 parts of nucleus-chlorinated styrene (a mixture of 65 percent of ortho isomer and 35 percent of para isomer). The resulting solution was subjected to bulk polymerization with stirring to bring about phase inversion, thereby forming particles of the polybutadiene rubber, and then the polymerization was transferred to suspension polymerization to complete the polymerization. In the above manner, a rubber-modified methyl methacrylate-nucleus-chlorinated styrene resin was prepared. The thus obtained resin had physical properties of a flow characteristic of 80 × 10⁻³ cc/sec, Izod impact value of 8 kg.cm/cm, tensile strength of 340 kg/cm², flexural modulus of 27,000 kg/cm² and heat distortion temperature of 87°C.

The nucleus-brominated aromatic carbonate copolymer used in Example 1 and the above-mentioned resin were mixed with each other in a weight ratio of 1:1. Subsequently, the resulting mixture was kneaded by means of an extruder to obtain a desired resin composition. Physical properties of the thus obtained composition and of a molded article prepared therefrom were as follows:

| | |
|---|---|
| Flow characteristic (260°C, Load 30 kg) | $50 \times 10^{-3}$ cc/sec |
| Izod impact value (notched ¼" bar) | 25 kg.cm/cm |
| Tensile strength | 550 kg/cm$^2$ |
| Flexural modulus | 28,000 kg/cm$^2$ |
| Heat distortion temperature (18.5 kg/cm$^2$, not annealed) | 105°C |

According to the same combustibility test as Example 1, the combustion time of the test piece was within 5 seconds both after the first and second ignition.

EXAMPLE 7

A bifunctional phenol mixture comprising 50 parts of 2,2-bis(4-hydroxyphenyl)propane and 50 parts of 2,2-bis-(4-hydroxy-3,5-dichlorophenyl)propane was treated according to the phosgene method to prepare a nucleus-chlorinated aromatic carbonate copolymer having an intrinsic viscosity of 0.60 in methylene chloride at 20°C.

On the other hand, a mixture comprising 100 parts of a polybutadiene latex used in Example 1, 7.1 parts of acrylonitrile, 23.5 parts of a nucleus-chlorinated styrene (consisting of 65 percent of ortho isomer and 35 percent of para isomer) and 9.4 parts of styrene was subjected to ordinary emulsion graft polymerization to obtain an emulsion of a graft copolymer. This emulsion, in an amount to contain resin solids corresponding to 25 parts of the graft copolymer, was latex-blended with an emulsion containing 75 parts of an acrylonitrile-nucleus-chlorinated styrene-styrene copolymer which had separately been obtained according to emulsion copolymerization (the monomer feed ratio of acrylonitrile/nucleus-chlorinated styrene-styrene was 17.7:58.8:23.5 by weight, and the nucleus-chlorinated styrene had the same isomer ratio as mentioned previously). The thus blended latex was coagulated and separated to obtain a rubber-modified acrylonitrile-nucleus-chlorinated styrene resin composition, which had physical properties as follows: flow characteristic $130 \times 10^{-3}$ cc/sec, Izod impact value 8 kg.cm/cm, tensile strength 500 kg/cm$^2$ and heat distortion temperature 95°C.

Thereafter, a powder of the aforesaid nucleus-chlorinated aromatic carbonate copolymer and a powder of the rubber-modified acrylonitrile-nucleus-chlorinated styrene resin composition were mixed with each other in a weight ratio of 3:2. The resulting mixture was melted and kneaded by means of an extruder at a cylinder temperature of 260°C, and then pelletized to obtain a resin composition. The thus obtained resin composition was subjected to injection molding at a cylinder temperature of 250°C. Physical properties of the test piece were as follows:

| | |
|---|---|
| Izod impact value (notched ¼" bar) | 27 kg.cm/cm |
| Tensile strength | 630 kg.cm/cm$^2$ |
| Heat distortion temperature (18.5 kg/cm$^2$, not annealed) | 120°C |

According to the same combustibility test as in Example 1, the flames, both after the first and second ignition, extinguished within 15 seconds after removal of the burner, and no ignition of the cotton was observed.

EXAMPLE 8

The nucleus-brominated aromatic carbonate copolymer prepared in Example 1 and the rubber-modified acrylonitrile-nucleus-chlorinated styrene resin prepared in Example 4 were mixed with each other in a weight ratio of 4:6 together with 2 parts of diantimony trioxide. The resulting mixture was melted and kneaded by means of an extruder at a cylinder temperature of 250°C to obtain a pelletized product. The test pieces molded in the same manner as in Example 1 indicated the following physical properties.

| | |
|---|---|
| Izod impact value (notched ¼" bar) | 25 kg.cm/cm |
| Tensile strength | 540 kg/cm$^2$ |
| Heat distortion temperature (18.5 kg/cm$^2$, not annealed) | 110°C |

According to the same combustion test as in Example 1, the flames extinguished within 5 seconds both after the first and second ignition after removal of the burner.

EXAMPLE 9

A blended composition (85:15) of component A and component B in Example 1 was prepared in the same manner as in Example 1.

For comparison, several blended compositions (Control 1–3) were also prepared by replacing component A and/or component B in the above composition with other polymeric components as described below.

The non-halogenated polycarbonate was prepared by treating bisphenol A, i.e. 2,2-bis(4-hydroxyphenyl) propane, according to the phosgene method. This polycarbonate had an intrinsic viscosity of 0.55 in methylene chloride solution, tensile strength of 660 kg/cm$^2$, Izod impact strength of 8 kg.cm/cm and heat distortion temperature of 128°C.

The rubber-modified nucleus-chlorinated styrene resin was prepared by the following method. 6 Parts of polybutadiene (prepared according to solution polymerization; Mooney viscosity ML4 at 100°C, 35) was dissolved in a monomer mixture comprising 34 parts of styrene and 60 parts of nucleus-chlorinated styrene (a mixture of 65 percent of ortho isomer and 35 percent of para isomer), and 2 parts of n-butyl stearate was added thereto. The resulting solution was subjected to bulk polymerization with stirring at 95°C for 4 hours to bring about phase inversion, thereby forming particles of the polybutadiene rubber, and then the polymerization was transferred to suspension polymerization, whereby the temperature was continuously elevated from 70°C to 130°C over 8 hours, to complete the polymerization. In the above manner, a rubber modified nucleus-chlorinated styrene resin was prepared, of which more than 90 percent by weight was formed in spherical particle of 8 to 60 mesh. The thus obtained resin had physical properties of Izod impact strength of 8.2 kg.cm/cm, tensile strength of 300 kg/cm$^2$, and heat distortion temperature of 90°C.

The rubber-modified styrene resin was prepared by the following method. 6 Parts of the same polybutadiene as used in the preparation of the above rubber-modified nucleus-chlorinated styrene resin was dissolved in 60 parts of styrene, and 2 parts of n-butyl stearate was added thereto. The resulting solution was subjected to bulk polymerization at 60°C for 8 hours. The thus obtained resin had physical properties of tensile strength of 320 kg/cm², Izod impact strength of 7.4 kg.cm/cm and heat distortion temperature of 85°C.

Physical properties of the test pieces prepared from these compositions in the same manner as in Example 1 are set forth in the following table.

|  | Example 9 | Control 1 | Control 2 | Control 3 |
|---|---|---|---|---|
| Composition: (parts) |  |  |  |  |
| Component A | 85 | — | — | 50 |
| Component B | 15 | — | 15 | — |
| Non-halogenated polycarbonate | — | 85 | 85 | — |
| Rubber-modified nucleus-chlorinated styrene resin | — | 15 | — | — |
| Rubber-modified styrene resin | — | — | — | 50 |
| Physical properties: |  |  |  |  |
| Tensile strength (Kg/cm²) | 670 | 600 | 650 | 480 |
| Izod impact strength (notched bar: ¼") (Kg.cm/cm) | 26 | 7.0 | 27 | 2.8 |
| Heat distortion temperature (not annealed; °C) | 113 | 117 | 122 | 100 |
| Flame resistance | extinguished within 5 seconds | not extinguished within 25 seconds |  |  |

What we claim is:

1. A resin composition high in flame resistance and excellent in mechanical properties and moldability comprising:
   A. a polycarbonate resin having repeating units represented by the formula,

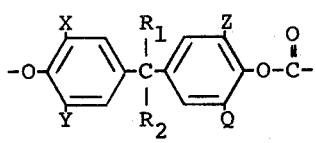

wherein X, Y, Z and Q are individually one member selected from hydrogen, chlorine and bromine atoms, provided that not all of them are hydrogen atoms at the same time, and that in case one of the substituents X to Q is a chlorine or bromine atoms, the other 3 substituents are not bromine or chlorine atoms; and $R_1$ and $R_2$, which be the same or different, are individually a hydrogen atom or an alkyl group having 5 or less carbon atoms, and having an intrinsic viscosity in the range from 0.40 to 1.0 in methylene chloride at 20°C, and
   B. a rubber-modified nucleus-chlorinated styrene resin having repeating units derived from a nucleus-chlorinated styrene represented by the formula

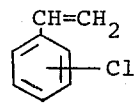

and repeating units derived from a member selected from the group consisting of a vinyl cyanide and a methacrylic acid ester of an alkyl alcohol having at most 12 carbon atoms, which has been modified with a rubbery polymer derived from a conjugated diene monomer selected from the group consisting of butadiene and isoprene, wherein comprising 90 to 20 percent by weight of said polycarbonate resin and 10 to 80 percent by weight of said rubber-modified nucleus-chlorinated styrene resin.

2. A resin composition according to claim 1, wherein the polycarbonate resin is a copolymer derived from the bifunctional phenolic mixture comprising at least 1 percent by weight of 2,2-bis(3,5-dihalogeno-4-hydroxyphenyl)alkane and the balance being 2,2-bis(hydroxyphenyl)alkane.

3. A resin composition according to claim 1, wherein the rubber-modified nucleus-chlorinated styrene resin contains a polymer unit derived from the conjugated diene monomer in an amount of 3 to 30 percent by weight based on the weight of the resin, a polymer unit derived from a nucleus-chlorinated styrene in an amount of 50 to 87 percent by weight, and a polymer unit derived from a member selected from the group consisting of a vinyl cyanide and an alkyl methacrylate in an amount of 10 to 30 percent by weight, based on the weight of the resin.

4. A resin composition according to claim 1, wherein said rubber-modified nucleus-chlorinated styrene is a graft copolymer of said repeating monomer units grafted on said rubbery polymer.

5. A resin composition according to claim 1, wherein said rubber-modified nucleus-chlorinated styrene resin is a blend of said rubbery polymer with a graft copolymer of said repeating monomer units grafted on the rubbery copolymer.

6. A resin composition according to claim 1, wherein said rubber-modified nucleus-chlorinated styrene resin has a flow characteristic such that the amount of melt flow through a standard nozzle of 1mm in diameter and 2mm in length measured at 260°C. under a load of 30kg. is from 1 to 500 × 10⁻³ cc/sec.

* * * * *